United States Patent
Boutaghou et al.

(10) Patent No.: US 6,801,405 B2
(45) Date of Patent: *Oct. 5, 2004

(54) UNIBODY (MONOCOQUE) ARM DESIGN FOR HIGH PERFORMANCE DISC DRIVES

(75) Inventors: Zine-Eddine Boutaghou, Vadnais Heights, MN (US); Markus E. Mangold, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/042,061

(22) Filed: Oct. 24, 2001

(65) Prior Publication Data

US 2002/0057536 A1 May 16, 2002

Related U.S. Application Data

(60) Provisional application No. 60/243,219, filed on Oct. 25, 2000.

(51) Int. Cl.[7] .............................. G11B 21/16; G11B 5/48
(52) U.S. Cl. ..................... 360/265.9; 369/244; 369/247
(58) Field of Search ................................ 428/603, 604; 52/783.11, 783.14–78.19, 729.3, 573.1, 731.7; 360/265.9; 369/244, 247

(56) References Cited

U.S. PATENT DOCUMENTS

| | | | |
|---|---|---|---|
| 3,610,637 A | * 10/1971 | Kinberg et al. | 369/67 |
| 3,812,535 A | * 5/1974 | Higgins et al. | 360/244.2 |
| 4,286,297 A | 8/1981 | Root et al. | |
| 4,443,824 A | * 4/1984 | Frater et al. | 360/264 |
| 4,760,478 A | 7/1988 | Pal et al. | 360/104 |
| 4,819,094 A | 4/1989 | Oberg | 360/104 |
| 4,996,616 A | 2/1991 | Aoyagi et al. | |
| 5,007,225 A | * 4/1991 | Teasdale | 52/783.17 |
| 5,012,370 A | * 4/1991 | Hikichi et al. | 360/246.8 |
| 5,047,883 A | * 9/1991 | Aldrich et al. | 360/271.5 |
| 5,061,541 A | * 10/1991 | Gertel | 428/116 |
| 5,126,904 A | 6/1992 | Sakurai | |
| 5,145,553 A | 9/1992 | Albrechta et al. | 156/640 |
| 5,185,683 A | 2/1993 | Oberg et al. | 360/104 |
| 5,187,625 A | 2/1993 | Blaeser et al. | |
| 5,377,052 A | * 12/1994 | Guzman et al. | 360/261.1 |
| 5,408,372 A | 4/1995 | Karam, II | |
| 5,612,945 A | * 3/1997 | Van Rosmalen | 369/247 |
| 5,627,701 A | * 5/1997 | Misso et al. | 360/265.8 |
| 5,701,218 A | 12/1997 | Boutaghou | 360/104 |
| 5,731,731 A | 3/1998 | Wilcox et al. | |
| 5,731,931 A | 3/1998 | Goss | |
| 5,734,526 A | 3/1998 | Symons | |
| 5,793,569 A | 8/1998 | Christianson et al. | |
| 5,796,556 A | 8/1998 | Boutaghou | 360/104 |
| 5,812,342 A | 9/1998 | Khan et al. | |

(List continued on next page.)

FOREIGN PATENT DOCUMENTS

| | | | |
|---|---|---|---|
| CH | 650974 A5 * | 8/1985 | ........... B32B/29/08 |
| DE | 2628801 A * | 12/1977 | ............. E04C/2/26 |
| EP | 74732 A1 * | 3/1983 | ............. E04C/2/34 |
| EP | 294176 A2 * | 12/1988 | ........... B32B/17/00 |
| JP | 63168844 A * | 7/1988 | ............. G11B/7/09 |
| JP | 02130786 A * | 5/1990 | .......... G11B/33/14 |
| JP | 03021442 A * | 1/1991 | ............. B32B/3/28 |
| JP | 09040061 A * | 2/1997 | .......... B65D/85/57 |
| WO | WO 9326006 A1 * | 12/1993 | ......... G11B/17/038 |

*Primary Examiner*—William Klimowicz
(74) *Attorney, Agent, or Firm*—Kinney & Lange, P.A.

(57) ABSTRACT

An actuator arm design having a close cross section which greatly improves the performance of the disc drive. The actuator arm is formed of a top skin, a bottom skin, and a core. The core may be formed of a corrugated metal, or a foam metal, or a combination of the two. As a result of this structure of the arm, the arm is highly stiff, yet low mass which yields an arm having a high resonant frequency.

13 Claims, 7 Drawing Sheets

U.S. PATENT DOCUMENTS

| | | |
|---|---|---|
| 5,815,348 A | 9/1998 | Danielson et al. |
| 5,850,319 A | 12/1998 | Tangren |
| 5,856,896 A | 1/1999 | Berg et al. |
| 5,883,759 A | 3/1999 | Schulz .................. 360/104 |
| 5,894,655 A | 4/1999 | Symons |
| 5,909,342 A | 6/1999 | Forbord et al. ............ 360/106 |
| 5,955,176 A | 9/1999 | Erpelding et al. .......... 428/209 |
| 5,956,919 A * | 9/1999 | McCracken ................ 52/729.3 |
| 5,973,883 A | 10/1999 | Yanagisawa |
| 6,002,552 A | 12/1999 | Leung |
| 6,014,289 A * | 1/2000 | Goss ...................... 360/244.1 |
| 6,144,530 A * | 11/2000 | Shiraishi et al. ......... 360/244.1 |
| 6,268,981 B1 | 7/2001 | Coon et al. |
| 6,421,206 B1 | 7/2002 | Khan |
| 2002/0085313 A1 * | 7/2002 | Boutaghou et al. ...... 360/244.9 |
| 2002/0109943 A1 * | 8/2002 | Crane et al. ............. 360/244.3 |

\* cited by examiner

UNIBODY (MONOCOQUE) ARM DESIGN FOR HIGH PERFORMANCE DISC DRIVES

CROSS-REFERENCE TO RELATED APPLICATION(S)

This application claims priority from provisional application Ser. No. 60/243,219, filed on Oct. 25, 2000, and entitled "Unibody (Monocoque) Arm Design for High Performance Disc Drives" by Zine-Eddine Boutaghou, which is herein incorporated by reference.

BACKGROUND OF THE INVENTION

The present invention relates to a disc drive storage system. In particular, the present invention relates to an improved arm design having low mass and high stiffness for use in a disc drive system.

Disc drives are well known in the art and comprise several discs, each disc having several concentric data tracks for storing data. A transducing head carried by a slider is used to read from or write to a data track on the disc. The discs are mounted on a spindle motor which causes the discs to spin. As the discs are spun, the slider is positioned above a data track on the disc by moving an actuator arm on which the head is suspended. The actuator arm is moved using a large scale actuator motor, such as a voice coil motor. The time it takes for the actuator arm to position the slider at a selected data track is called the seek time.

In some applications, such as desk top computers, it is desired to minimize seek times as much as possible. In other applications, such as in lap top computers, it is desired to minimize energy consumption while still retaining a reasonable seek time. The energy required to position the slider at a selected data track depends in part on the mass of the actuator arm. Thus, one way to both improve seek times and minimize energy consumption is to reduce the mass of the actuator arm.

In addition, the mass of the actuator arm affects the ability of the slider to follow the surface of the disc. The actuator arm experiences certain resonance modes, which adversely affect the performance of the transducing head on the slider. To minimize the effects of resonance of the actuator arm, it is desired to keep the resonant frequency of the actuator arm relatively high. A high resonant frequency of the actuator arm results in lower resonant frequency amplitudes, which makes it easier to compensate for the resonant frequency using control algorithms incorporated into the control system used to position the slider.

Two factors which directly affect the resonant frequency of the actuator arm are the mass of the actuator arm and the stiffness of the actuator arm. To achieve the desired resonant frequency of the actuator arm, the mass must be minimized and the stiffness must be maximized. In other words, it is desired that the actuator arm be very lightweight, yet very stiff.

Currently, two methods are used in an attempt to increase the overall stiffness of the arms. The first method involves altering the geometrical features of a solid arm design. Current designs of actuator arms utilize an open cross section of material, such as a U-shaped beam, to form the actuator arm. The second is to tailor the stiffness of the arm by forming the arm from materials having a higher Young's Modulus, such as Al, SS, or Al Be. However, these attempts at improving the stiffness of the arm also tend to increase the mass of the arm, which in turn adversely affects the seek time of the disc drive and the resonance modes of the actuator arm.

Thus, there is a need in the art for actuator arms having increased stiffness, while keeping the mass of the actuator arm low.

BRIEF SUMMARY OF THE INVENTION

The present invention is a unibody design for an actuator arm for use in a disc drive. The actuator arm is designed with a closed cross-section, allowing the actuator arm to be formed with a low mass, but high stiffness. To form the closed cross-section, the actuator arm is formed by a top skin and a bottom skin, with a core located between the top and bottom skins. The core serves to further stiffen the actuator arm, and may be formed of a variety of materials, including a corrugated metal, foam ceramic, foam metal, aluminum, a polymer, or even silicon. The skins may be affixed to the core, such as by adhesive or using spot welding depending on the materials used. A further benefit of forming the core from such materials is that the core then serves to reduce noise emissions and increase the dampening of the structure.

DETAILED DESCRIPTION

Figure 1:
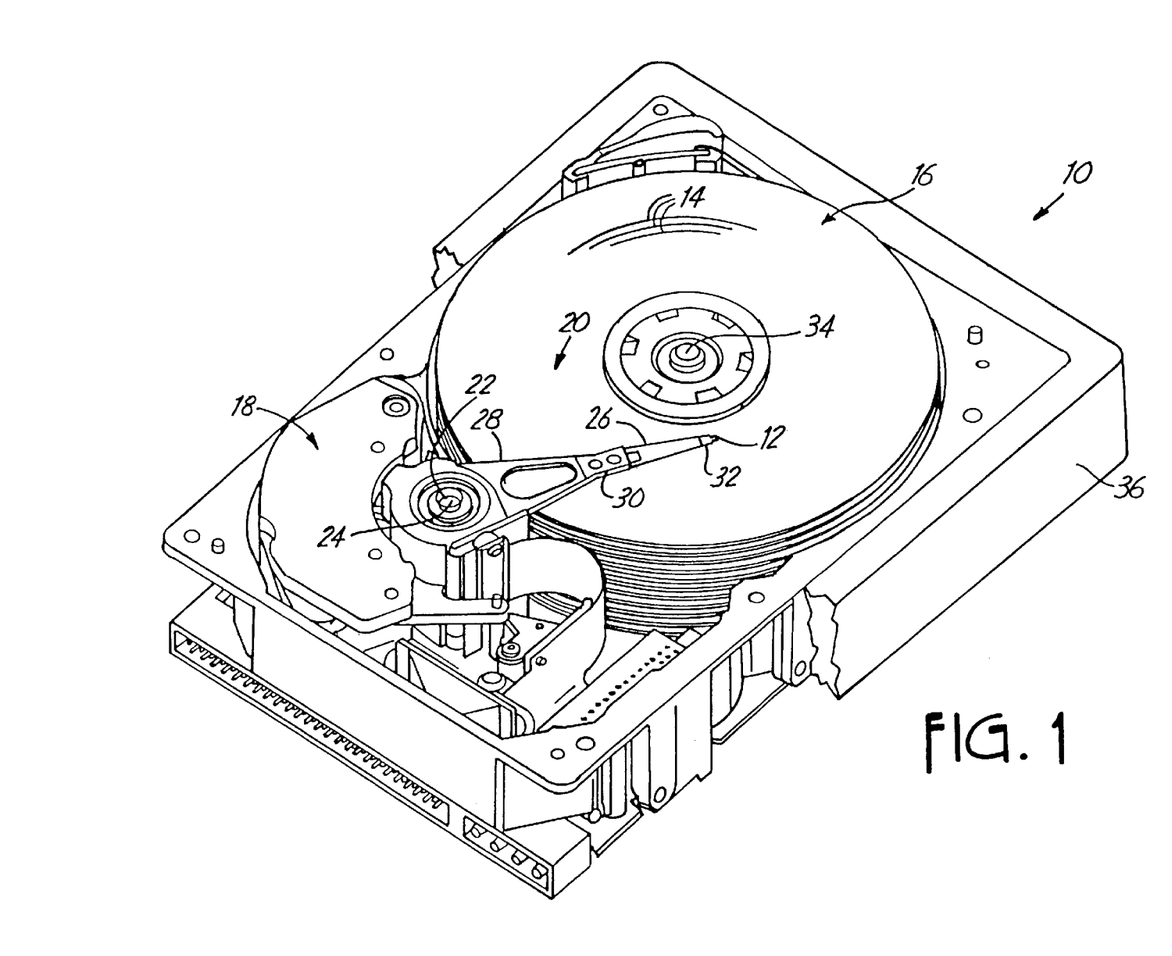
FIG. 1 is a perspective view of a disc drive actuation system for positioning a slider over a track on a disc.

FIG. 1 is a perspective view of a disc drive actuation system 10 for positioning a slider 12 over a selected data track 14 of a magnetic storage medium 16, such as a disc. The actuation system 10 includes a voice coil motor (VCM) 18 arranged to rotate a slider suspension 20 around an axis 22 on a spindle 24. The slider suspension 20 includes a load beam 26 connected to the actuator arm 28 at a slider mounting block 30. A flexure 32 is connected to the end of the load beam 26, and carries the slider 12. The slider 12 carries a magneto-resistive (MR) element (not shown) for reading and/or writing data on the concentric tracks 14 of the disc 16. The disc 16 rotates around an axis 34, which causes the slider 12 to "fly" a small distance above the surface of the disc 16. The distance at which the slider 12 flies above the disc 16 is termed the fly height.

Figure 2:
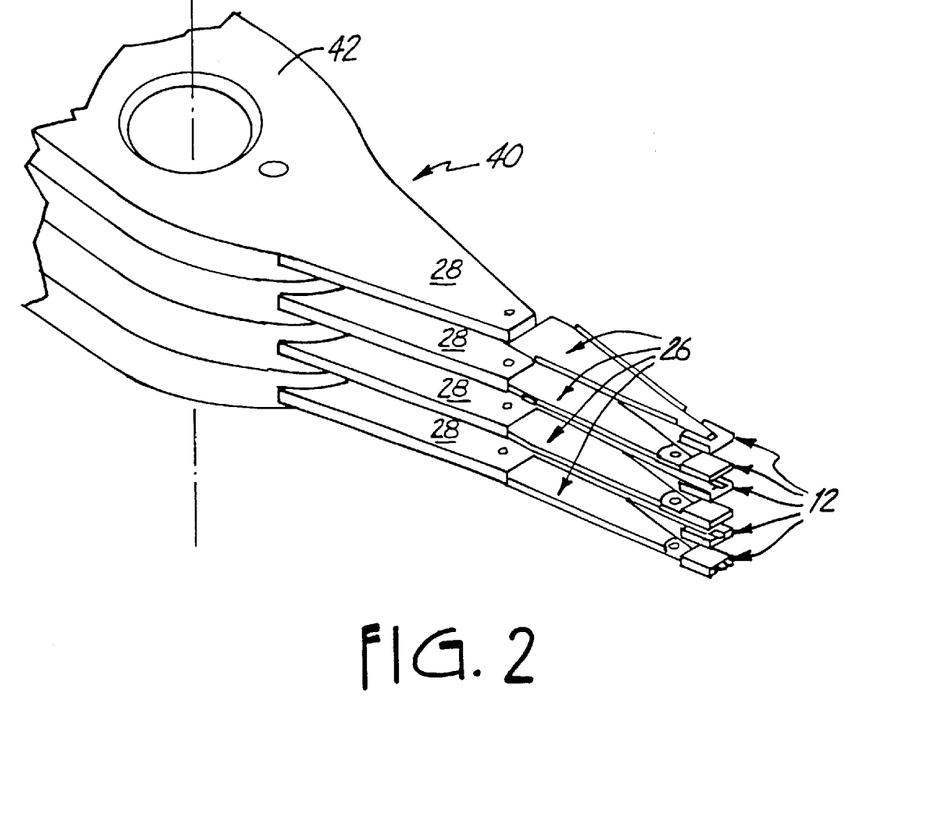
FIG. 2 is a perspective view of an actuator assembly within the disc drive shown in FIG. 1.

FIG. 2 is an enlarged perspective view more clearly showing a portion of the disc drive. Shown in FIG. 2 is an actuator arm assembly 40 comprising a base 42 and several actuator arms 28. Attached to each actuator arm 28 is a load beam 26, and on each load beam is one or more sliders 12. The actuator arms 28 are arranged so that the arms 28 can be positioned to fit between the discs 16 of the disc drive (FIG. 1). In addition the sliders 12 are arranged on the actuator arms 28 such that a slider 12 is placed proximate to both a top and bottom surface of each disc 16.

Each actuator arm 28 is formed separately, allowing several arms 28 to be stacked to form the base 42. To position one of the sliders 12 above a desired track 14 on the disc 16, an actuator arm 28 is caused to move over the surface of the disc 16 until the slider 12 reaches the desired track 14. The amount of time it takes for the slider 12 to be positioned above the desired track 14 is called the seek time. Once the slider 12 is positioned above the desired track 14 on the disc 16, for proper functioning of the MR element it is preferred that the fly height of the slider 12 be maintained at the desired height.

The fly height of the slider 12 may be adversely affected by numerous conditions in the actuator arm assembly 40, including vibrations in the suspension 20. The suspension 20 may vibrate for a variety of reasons, including resonance of the actuator arm 28 at certain resonant frequencies. The resonant frequency of the actuator arm 28 is related to the mass and stiffness of the actuator arm 28 based on the following equation:

$$\omega = \sqrt{K/M}$$

where $\omega$ is the resonant frequency of the arm, K is the stiffness, and M is the mass of the actuator arm 28.

An actuator arm 28 with high stiffness and low mass will have a relatively high resonant frequency. A high resonant frequency results in low resonant frequency amplitudes. Designing the arm 28 so that it has a high resonant frequency (with low amplitude) makes it easier to control the actuator arm 28 to compensate for the effects of the resonant frequency modes of the actuator arm 28. As a result, the preferred design of an actuator arm 28 is one having high stiffness while at the same time having low mass.

Designing an actuator arm 28 with low mass improves other aspects of the disc drive as well. For instance, the mass of the actuator arm 28 is related to the energy consumption of the drive. The larger the mass of the actuator arm 28, the higher the energy consumption of the disc drive. Conversely, the lower the mass of the actuator arm 28, the lower the energy consumption of the disc drive. Low energy consumption is particularly desirable in applications having a limited power supply, such as laptop computers. Furthermore, reducing the mass of the actuator arm 28 results in improved seek times.

Figure 3:
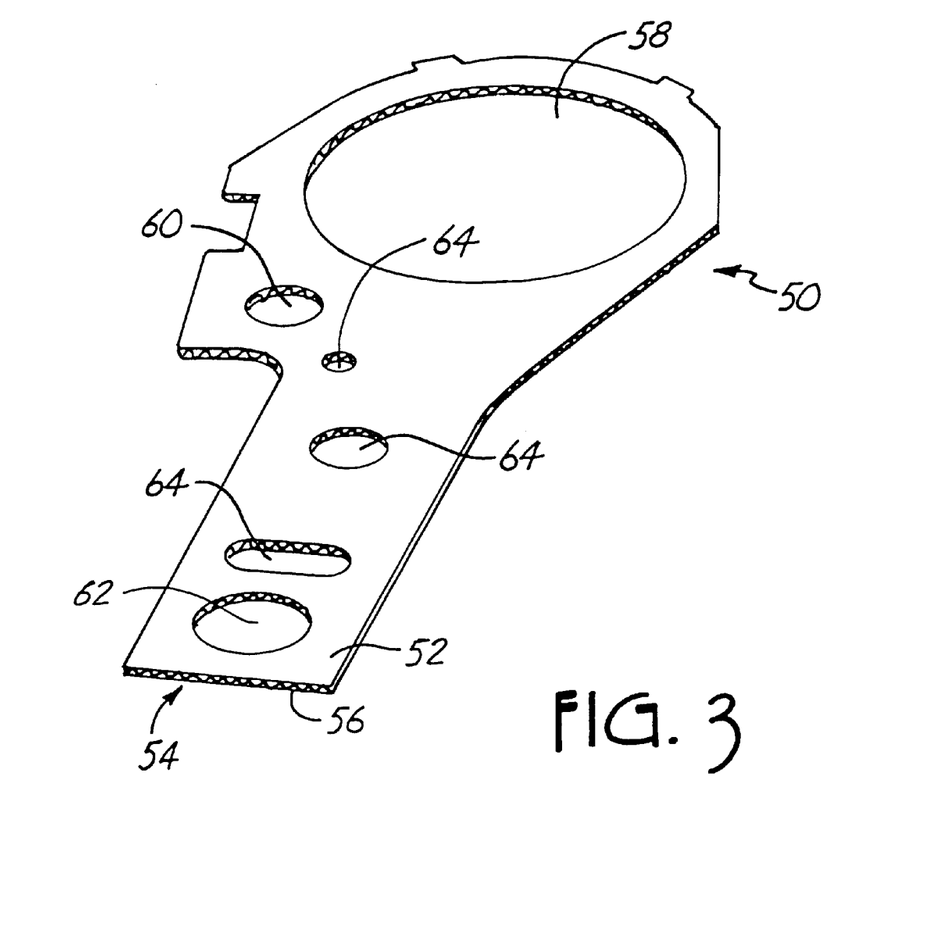
FIG. 3 is a perspective view of a single arm.

Thus, it is desired to create an actuator arm 28 which is not only stiff enough to properly function in the disc drive, but which also has a low mass. FIG. 3 is a perspective view of a stackable arm 50 made according to the present invention. The stackable arm 50 is designed to have a high stiffness, while at the same time having a low mass.

The arm 50 is formed of an upper skin 52, a core 54, and a lower skin 56. Included on the arm 50 is a cartridge bearing hub hole 58, an alignment hole 60, a swage hole 62, and mass reduction features 64. The hub hole 58 allows the arm 50 to fit around the bearing of the spindle. The alignment hole 60 serves to align the arms 50 once they are stacked in disc drive 10. To align the arm 50 with the load beam, a swage hole 62 is provided. The various mass reduction features 64 serve to lighten the arm 50. The upper skin 52, core 54, and lower skin 56 result in an arm 50 which has a closed cross section. The closed cross section results in the arm 50 having a unibody construction which is very stiff, yet also low mass.

Figure 4:
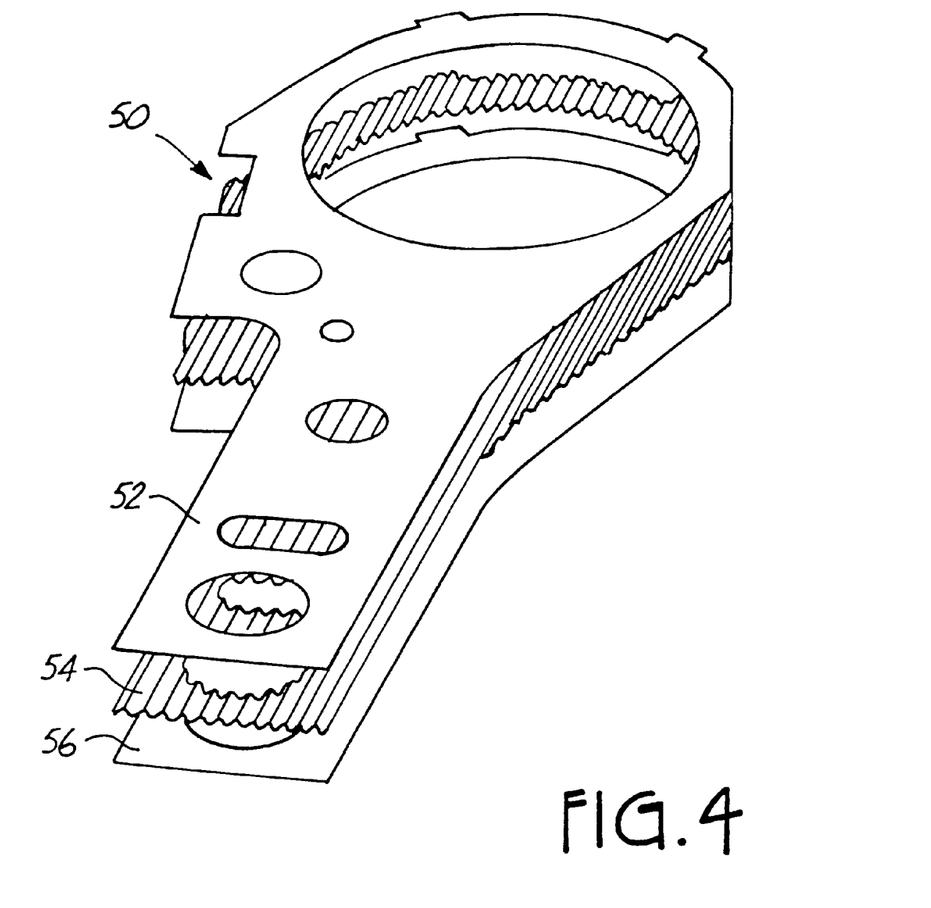
FIG. 4 is an exploded perspective view of an actuator arm.

FIG. 4 is an exploded perspective view of the arm 50 more clearly illustrating the skins 52, 56 and core 54. As shown in FIG. 4, the inner core 54 is corrugated so that the majority of the inner volume of the arm 50 is taken up by air. The skins 52, 56 may be formed of any suitable material, such as metal. In particular, either aluminum or stainless steel are suitable materials for the skins 52, 56. Similarly, the corrugated core 54 may likewise be formed of a metal, such as aluminum. However, the core 54 need not be formed of the same material as the skins 52, 56.

Both the skins 52, 56 and core 54 can easily be made utilizing a computer design program, such as a computer aided drawing software program, to design the arm and create patterns for the desired configurations of the skins 52, 56 and core 54. Forming the skins 52, 56 is particularly convenient, because the skins 52, 56 can be formed by etching a flat metal sheet in the desired shape of the arm.

The corrugated core 54 may be formed using a variety of suitable processes, including stamping, molding, or extrusion. Formation of the corrugated core 54 also lends itself to being designed on a computer aided design program. For instance, just as when forming the skins 52, 56, the corrugated core 54 may be etched from a metal sheet using a pattern depicting the desired shape and configuration of the core. Once etched, the core 54 may be further processed to form the corrugation, such as by utilizing a forming tool to stamp or press the metal into the desired corrugated shape. Alternatively, it may also be possible to form the corrugated material first, and then etch or cut the core 54 from the already formed corrugated material.

Figure 5A:
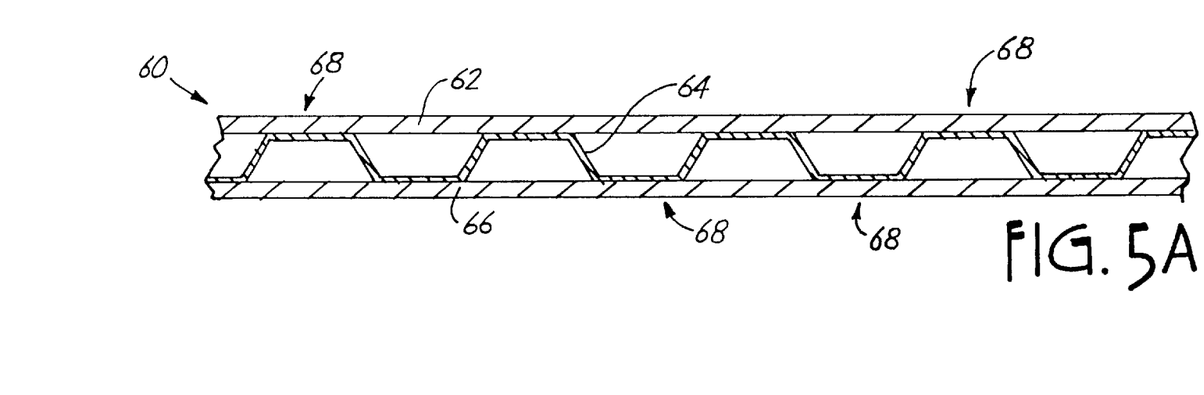
FIGS. 5A–5D are cross sectional views of a portion of an actuator arm according to several embodiments of the invention.

FIGS. 5A–5D are cross sectional views of a portion of an actuator arm according to several embodiments of the invention. In FIG. 5A, the cross section of an actuator arm 60 comprises an upper skin 62, a corrugated core 64, and a lower skin 66. The corrugated core 64 may be formed to have a variety of different shaped corrugations based on the desired stiffness of the core 64. However, a core 64 having straight walls, as shown in FIG. 5A, provides for easier and simplified manufacture of the actuator arm 60. To incorporate the core 64 into the arm construction, the core 64 may be affixed to the upper and lower skins 62, 66. One method of affixing the core 64 to the skins 62, 66 is to spot weld the core 64 to the skins 62, 66 at various points 68 where the corrugated core 64 meets the skins 62, 66. The spot welds 68 can be placed as needed at locations on the actuator arm. Minimizing the number of welds 68 can further minimize the mass of the finished arm.

In addition, the core 64 may simply be adhered to the skins 62, 66. When adhering the core 64 to the skins 62, 66, a layer of adhesive may be applied to the top surface or bottom surface or both of the core 64 so that the core 64 will adhere to the skins 62, 66 at the locations where the core 64 contacts the skins 62, 66. Though more complicated, it may also be possible to apply adhesive to only those places 68 where the core 64 will contact the skins 62, 66. In yet another alternative, an adhesive may be applied to the inner surfaces of the skins 62, 66, rather than the core 64, to allow the skins 62, 66 to adhere to the core 64 at places 68 where the skins 62, 66 contact the core 64. Once again, the method of adhering the skins 62, 66 to the core 64 may have a small effect on the overall mass of the finished arm.

Figure 5B:
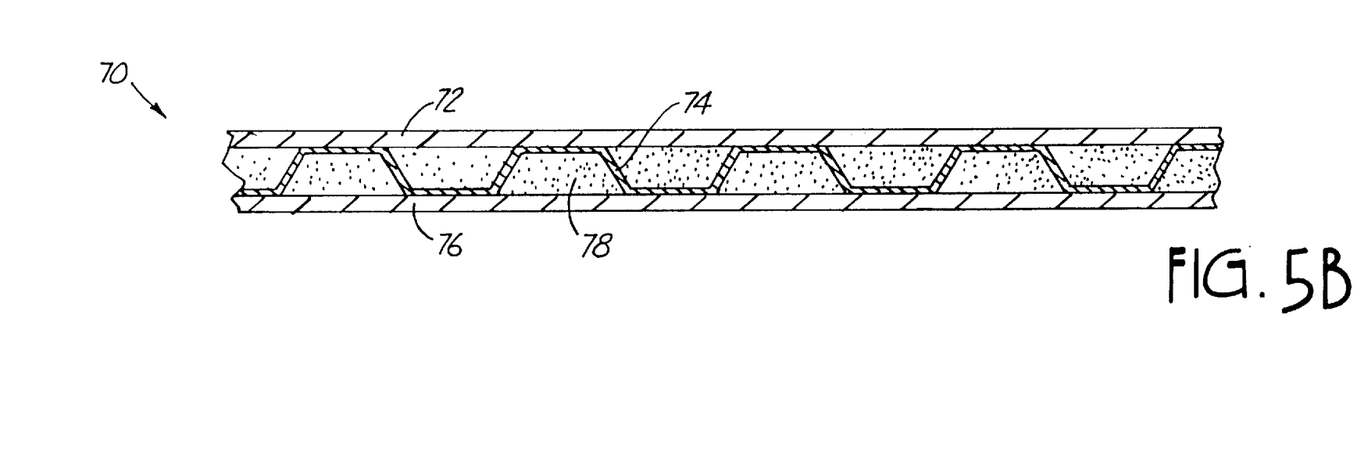

FIG. 5B is a cross-sectional view of another embodiment of the present invention. FIG. 5B shows a cross section of an arm 70 comprising a top skin 72, a bottom skin 76, and a corrugated core 74 surrounded by a light weight material 78. The light weight material 78 can be used to further increase the stiffness of the arm 70 while adding minimally to the mass of the arm 70. In addition to increasing the stiffness of the arm, the light weight material 78 has the added benefit of reducing noise emission and increasing damping of the structure. The light weight material 78 maybe formed of any suitable material, such as a foam metal, a foam ceramic, or a light weight polymer.

When using a foam material, incorporating the foam 78 into the core 74 maybe done by spraying or applying the foam 87 to the arm 70 using a suitable application means after the arm 70 has been formed to the desired configuration. Alternatively, the foam 78 may be incorporated into the corrugated core 74 before the skins 72, 76 are affixed to the core 74.

Figure 5C:
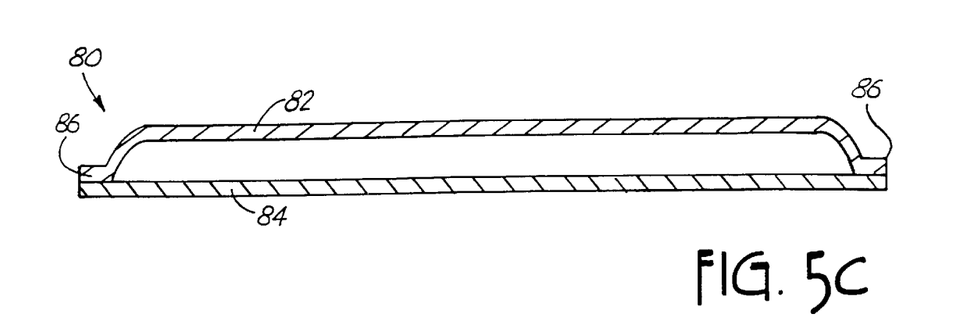

FIG. 5C is a cross sectional view of another embodiment of the present invention. FIG. 5C shows a cross section of an arm 80 comprising an upper skin 82 and a lower skin 84, but not comprising a corrugated core. The upper skin 82 is connected to the lower skin 84 at joints 86. The joints 86 may be created by welding or adhering the two skins 84, 86 together. This design allows for a simplified method of forming the arm 80 so that the stiffness of the arm 80 is still increased with only minimal manufacturing steps. However, the resulting stiffness of the arm 80 is less than that created when utilizing a design comprising two skins surrounding a foam or corrugated core.

In addition, the joints 86 have an undesirable effect on performance of the arm 80. The joints 86 create flanges, which do not contribute to the stiffness of the arm. Instead, the joints 86 result in an arm which performs only reasonably well for sway resonances, but performs poorly for torsion resonances. As a result, the overall benefit of the increased stiffness due to the closed cross section of the arm 80 is minimized.

Figure 5D:
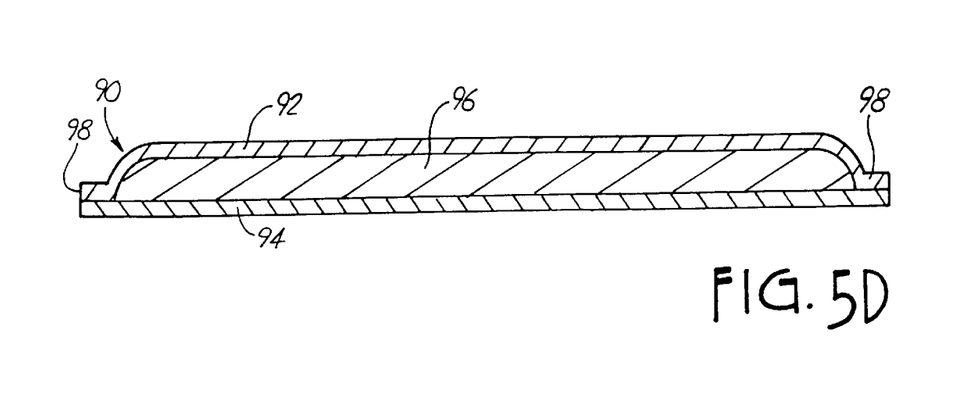

FIG. 5D is a cross sectional view of yet another embodiment of the present invention. FIG. 5D comprises a cross section of an arm 90. The cross section comprises an upper skin 92, a lower skin 94, and foam core 96. The upper skin 92 and lower skin 94 are connected at joints 98.

The core 96 may be a solid core, rather than a corrugated core as shown above. One suitable material for a solid core 96 is aluminum. An aluminum core 96 is beneficial because it is light weight, has increased dampening properties, and is easy to manufacture. As can be seen from FIGS. 5A through 5D, a variety of options exist for the design of the closed cross-section, as well as for the design of the core.

Figure 6A:
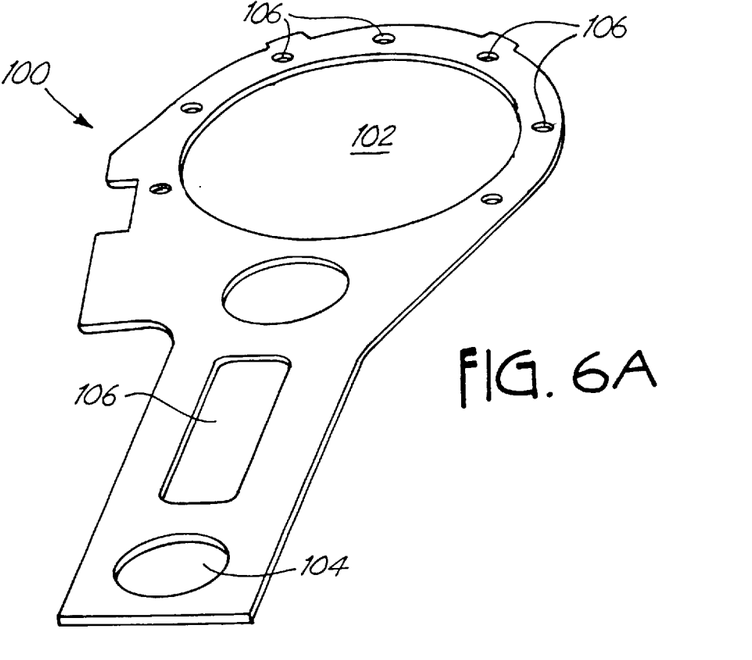
FIG. 6A is a top plan view of an actuator arm core illustrating mass reduction features.
Figure 6B:
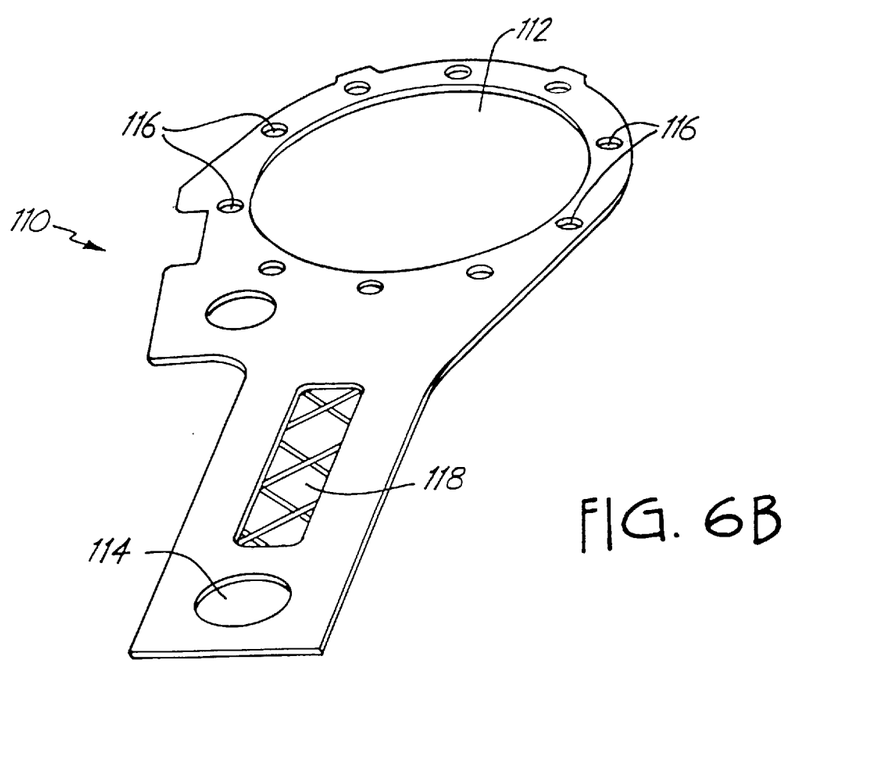
FIG. 6B is a perspective view of the disc drive actuation system showing the base casting of the disc drive.

It maybe possible to further reduce the mass of the actuator arm by incorporating additional mass reduction features into the design of the core. FIGS. 6A and 6B are top plan views illustrating examples of mass reduction features of cores for use in the unibody suspension arms according to the present invention. Shown in FIG. 6A is a core 100 having a hub hole 102 and swage hole 104. In addition, the core 100 has several mass reduction features 106 to further reduce the mass of the core 100. Similarly, FIG. 6B illustrates a core 110 having a hub hole 112 and swage hole 114. In addition, several mass reduction features 116 are included. A more complicated mass reduction feature 118 comprising cross hatching is formed on the core 110.

As described above, the cores 100, 102 may be formed of a corrugated, solid, or foam material. In addition, it may be possible to form the cores 100, 102 from a polymer using an injection molding process. It is also possible to form the cores 100, 102 from a material such as silicon. Forming a core 100, 102 from silicon allows the features of the core 100, 102, and in particular the mass reduction features 106, 116, 118 of the core, to be created through an etching process. Injection molding or etching processes would allow for creating more complicated mass reduction features throughout the cores 100, 102.

In addition to using the disclosed closed cross section design for actuator arms in disc drives, the features of this invention may be used in other aspects of the disc drive as well. For instance, the sound dampening features of a material formed of the skins and core may be particularly useful for use in forming the base casting 36 (FIG. 1) of the disc drive enclosure. Sound dampening features may be particularly useful in certain applications where it is desirable to minimize the sound emission of the disc drive.

Although the present invention has been described with reference to preferred embodiments, workers skilled in the art will recognize that changes may be made in form and detail without departing from the spirit and scope of the invention.

What is claimed is:

1. An actuator arm for supporting a slider, the actuator arm comprising:
    a proximal end connected to an actuation device;
    a distal end connected to a load beam;
    an outer skin extending from the proximal end to the distal end; and
    a stiffening corrugated inner core covered by the skin.

2. The actuator arm of claim 1 wherein the outer skin comprises a top and bottom skin.

3. The actuator arm of claim 2 wherein the stiffening corrugated inner core comprises a corrugated material between the top and bottom skins.

4. The actuator arm of claim 3 wherein the top and bottom skin are adhered to the core.

5. The actuator arm of claim 3 wherein the top and bottom skins are welded to the core.

6. The actuator arm of claim 2 wherein the stiffening corrugated inner core comprises a core formed of a polymer, aluminum, or silicon.

7. The actuator arm of claim 2 wherein the stiffening corrugated inner core further comprises mass reduction features.

8. An actuator arm assembly for supporting a slider, the actuator arm assembly comprising:
    proximal end connected to an actuation device;
    a distal end connected to a load beam;
    a shell extending from the distal end to the proximal end; and
    a corrugated support structure having a first portion connected to the proximal end of the shell and a second portion connected to the distal end of the shell, wherein the support structure increases a stiffness-to-mass ratio of the shell.

9. The actuator arm assembly of claim 8 wherein the corrugated support structure further comprises mass reduction features.

10. The actuator arm assembly of claim 8 wherein the shell comprises a top and a bottom portion.

11. The actuator arm assembly of claim 10 wherein the top and bottom portion of the shell are adhered to the corrugated support structure.

12. The actuator arm assembly of claim 11 wherein the top and bottom portion of the shell are welded to the corrugated support structure.

13. The actuator arm assembly of claim 8 wherein the corrugated support structure comprises a core formed of a polymer, aluminum, or silicon.

* * * * *

UNITED STATES PATENT AND TRADEMARK OFFICE
CERTIFICATE OF CORRECTION

PATENT NO. : 6,801,405 B2
DATED : October 5, 2004
INVENTOR(S) : Zine-Eddine Boutaghou et al.

It is certified that error appears in the above-identified patent and that said Letters Patent is hereby corrected as shown below:

Column 4,
Lines 63 and 67, delete "maybe", insert -- may be --

Column 5
Line 30, delete "atjoints", insert -- at joints --
Line 38, delete "maybe", insert -- may be --

Signed and Sealed this

Fifth Day of April, 2005

JON W. DUDAS
*Director of the United States Patent and Trademark Office*